US007647913B2

(12) United States Patent
Kohler et al.

(10) Patent No.: US 7,647,913 B2
(45) Date of Patent: Jan. 19, 2010

(54) COMBUSTION ENGINE POWERED WORKING MACHINE

(75) Inventors: Anders Kohler, Landvetter (SE); Anders Reuterberg, Lerum (SE); Niklas Sundberg, Alingsas (SE)

(73) Assignee: Husqvarna AB, Huskvarna (SE)

( * ) Notice: Subject to any disclaimer, the term of this patent is extended or adjusted under 35 U.S.C. 154(b) by 114 days.

(21) Appl. No.: 11/570,825

(22) PCT Filed: Jul. 8, 2004

(86) PCT No.: PCT/SE2004/001109

§ 371 (c)(1), (2), (4) Date: Dec. 7, 2007

(87) PCT Pub. No.: WO2006/006894

PCT Pub. Date: Jan. 19, 2006

(65) Prior Publication Data

US 2008/0196687 A1 Aug. 21, 2008

(51) Int. Cl.
*F02B 77/04* (2006.01)
*B01D 59/50* (2006.01)

(52) U.S. Cl. ................ 123/198 E; 55/486; 55/DIG. 14; 55/DIG. 28

(58) Field of Classification Search .............. 123/198 E; 55/482, 485, 486, DIG. 14, DIG. 28
See application file for complete search history.

(56) References Cited

U.S. PATENT DOCUMENTS

| | | | |
|---|---|---|---|
| 5,438,965 | A | 8/1995 | Aronsson et al. |
| 5,582,146 | A | 12/1996 | Linsbauer et al. |
| 5,595,153 | A | 1/1997 | Hoppner et al. |
| 2001/0005984 | A1 | 7/2001 | Knodler et al. |
| 2002/0189560 | A1 | 12/2002 | Linsbauer et al. |

*Primary Examiner*—Noah Kamen
(74) *Attorney, Agent, or Firm*—Pearne & Gordon LLP

(57) ABSTRACT

A portable, hand-held, combustion engine powered working machine comprises a tool unit (1) including a rotatable working tool (3), and a machine unit (2) including an internal combustion engine (11), an assembly (16) for supplying air and fuel to the engine, and an air cleaning system, which comprises a filter assembly (10) including at least two filters (84, 85), referred to as pre-filter (84) and main filter (85), for cleaning the air that shall be supplied to the engine. The pre-filter is accommodated in an upper filter chamber (86) between a top cover (83) and a pre-filter bottom (9), and the main filter is accommodated in a lower filter chamber under the pre-filter bottom, said lower filter chamber being defined by the underside of the pre-filter bottom, a second filter bottom (125) at a distance from the pre-filter bottom, and a closed, circumferential wall (120) between the pre-filter bottom and the second filter bottom, said closed, circumferential wall forming a downwards directed protrusion on the underside of the upper filter bottom.

10 Claims, 6 Drawing Sheets

COMBUSTION ENGINE POWERED WORKING MACHINE

TECHNICAL FIELD

The present invention relates to a portable, hand-held, combustion engine powered working machine comprising a tool unit including a rotatable working tool, and a machine unit including an internal combustion engine and an assembly for supplying air and fuel to the engine, and an air cleaning system, which comprises at least two filters, referred to as pre-filter and main filter for cleaning the air that shall be supplied to the engine.

BACKGROUND OF THE INVENTION

Portable working machines of the above defined type are known since long. They are often used for cutting concrete and similar materials. The cutting creates a lot of abrasive dust. Without air cleaning the engine will wear out in less than half an hour of operation. Efficient air cleaning therefore is vital and is attained mainly through a big filter volume, which will increase the service life of the machine. For example, a machine of this type, which also includes centrifugal cleaning of the air before the air enters the filters, is described in U.S. Pat. No. 5,438,965. This machine, its precursors and successors, belonging to the applicant's "Partner® K650-family", and variants of it, have been and are still widely used in the construction industry for cutting concrete and the like, and also by fire brigades for cutting holes in roofings or for penetrating vehicle wrecks, and similar tasks.

However, the air cleaning system of the machine described in U.S. Pat. No. 5,438,965 also has some shortcomings. For example, it requires a plurality of sealing strings which need to be accurately accommodated in narrow grooves, where they shall be compressed in order to provide the necessary sealing efficiency. These and other circumstances makes it cumbersome to dismount and to reassemble the filter system in connection with change or maintenance of the filters.

Other problems of the machine described in U.S. Pat. No. 5,438,965 mainly have to do with a traditional thinking as far as the general layout of the machine unit is concerned. For example, the engine cylinder with its bore is conventionally inclined somewhat rearwards relative to a base line of the entire machine and/or to the bottom of the machine unit. This tends to limit the available space for other important components of the machine unit than the filters, such as the muffler. This in turn restricts the possibilities to give the said components an appropriate design and shape. Therefore it has been suggested to incline the engine cylinder with its bore forwards in a direction towards the tool unit, which makes it possible to increase the volume of the muffler, if the muffler is located in the front, bottom part of the machine unit. This however sets new limits as far as the filter system is concerned.

BRIEF DISCLOSURE OF THE INVENTION

It is the purpose of the invention to address the above complex of problems in connection with the cleaning of air to be used for a combustion engine in a machine of the type mentioned in the preamble. Thus, the invention aims at any or all of the following achievements:

- to provide an air cleaning system including a filter assembly containing a pre-filter and a main filter in a pre-filter chamber and in a main filter chamber, respectively, wherein the components of the filter assembly can be readily assembled and clamped together in the machine unit from the outside by means of a restricted number of screws, clamps or similar, and equally easy to dismount by just unscrewing said screws from the outside;
- to provide an air cleaning system, including filter chambers, which require only few sealings, which sealings are not susceptible to damages in connection with dismounting or reassembly of the filter;
- to provide an air cleaning system including a filter assembly and means for centrifugal cleaning the air before it enters the filter assembly, and also to provide further dynamic cleaning of the air in the filter assembly before the air enters the pre-filter chamber;
- to provide an air cleaning system adapted to a machine unit, in which the engine cylinder and its bore is inclined forwards towards the tool unit, more particularly inclined such that the centre line of the cylinder bore forms a tilt angle larger than zero, in said direction, to a line which is perpendicular to any or both of the following lines:
  - a) a base line, which is a line coinciding with a horizontal surface on which the machine is resting in an upright position, when said supports on the underside of the machine unit contact said surface, and
  - b) a tangential line extending from a peripheral point of the tool, on the lower part of the tool when the machine has an upright position, to the bottom side of a rear support of the machine unit.

Any or all of the above mentioned achievements can be obtained in a machine according to the invention in which the pre-filter is accommodated in an upper filter chamber between a top cover and a first filter bottom, and the main filter is accommodated in a lower filter chamber under the first filter bottom, said lower filter chamber being defined by the underside of the first filter bottom, a second filter bottom at a distance from the first filter bottom, and a closed, circumferential wall between the first filter bottom and the second filter bottom, said closed, circumferential wall forming a downwards directed protrusion on the underside of the upper filter bottom.

Other aspects, achievements and characteristic features of the invention are apparent from the appending claims and from the following description of a preferred embodiment of the invention.

BRIEF DESCRIPTION OF THE DRAWINGS

In the following description of a preferred embodiment, reference will be made to the accompanying drawings, in which.

DESCRIPTION OF A PREFERRED EMBODIMENT

Figure 1:
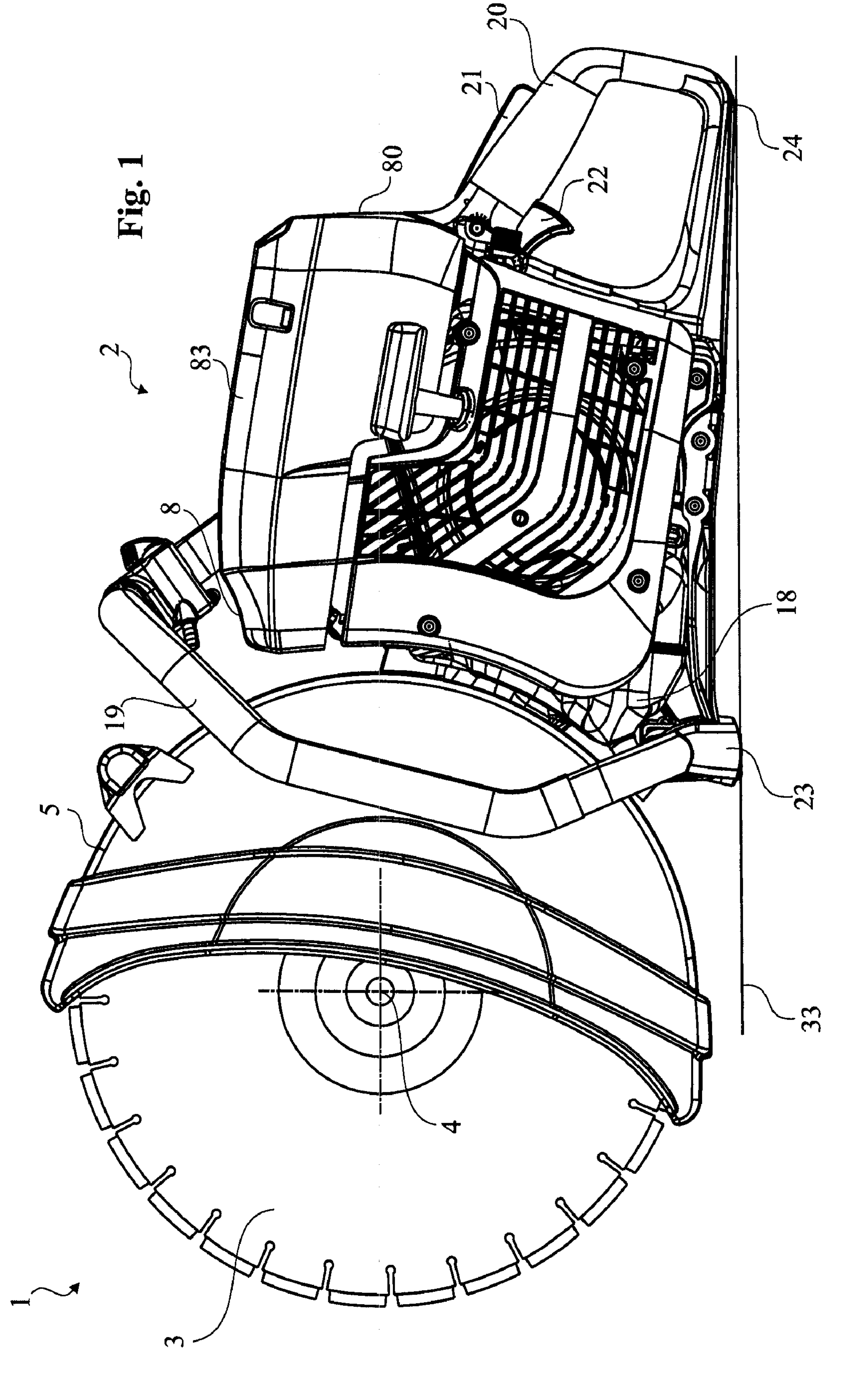
FIG. 1 is a side elevation of the portable working machine according to the preferred embodiment of the invention as viewed from the left.

The portable working machine shown in FIG. 1 comprises a tool unit 1 and a machine unit 2. The tool unit 1 is provided with a circular disc shaped tool 3 in the form of a diamond equipped cutter disc, which can be rotated about an axis of rotation 4, which is horizontal in the normal upraised position of the machine, as shown in FIG. 1. A disc guard is designated 5.

Figure 2:
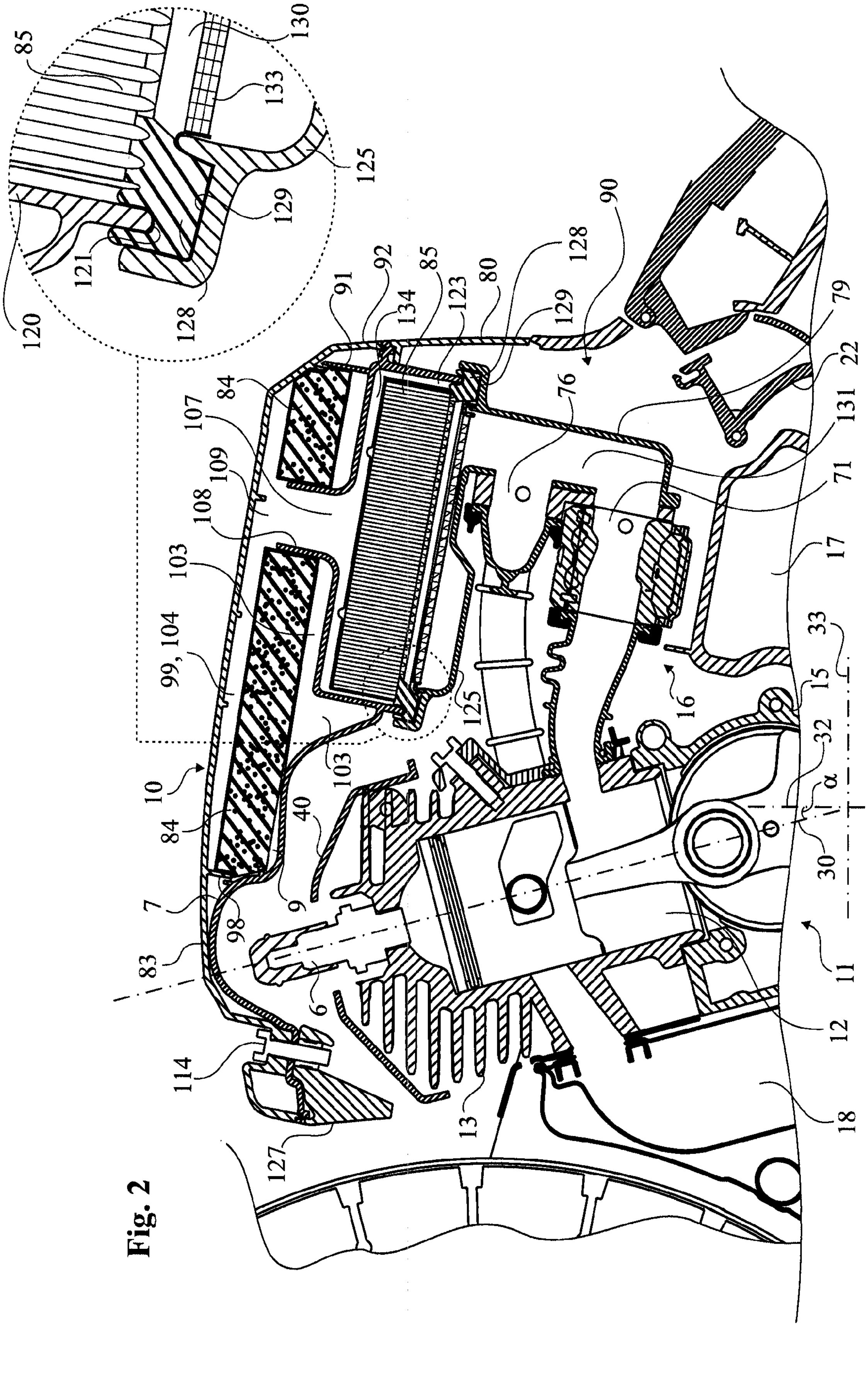
FIG. 2 shows the machine unit in a longitudinal cross section, coinciding with a vertical plane of symmetry of the rotational tool of the tool unit of the machine, FIG. 3 also shows the machine unit in a longitudinal cross section, the rear part in the same plane as FIG. 2 and the front part in a plane more to the left, corresponding to a section along the line A-A through a filter bottom shown in FIG. 4.
Figure 7:
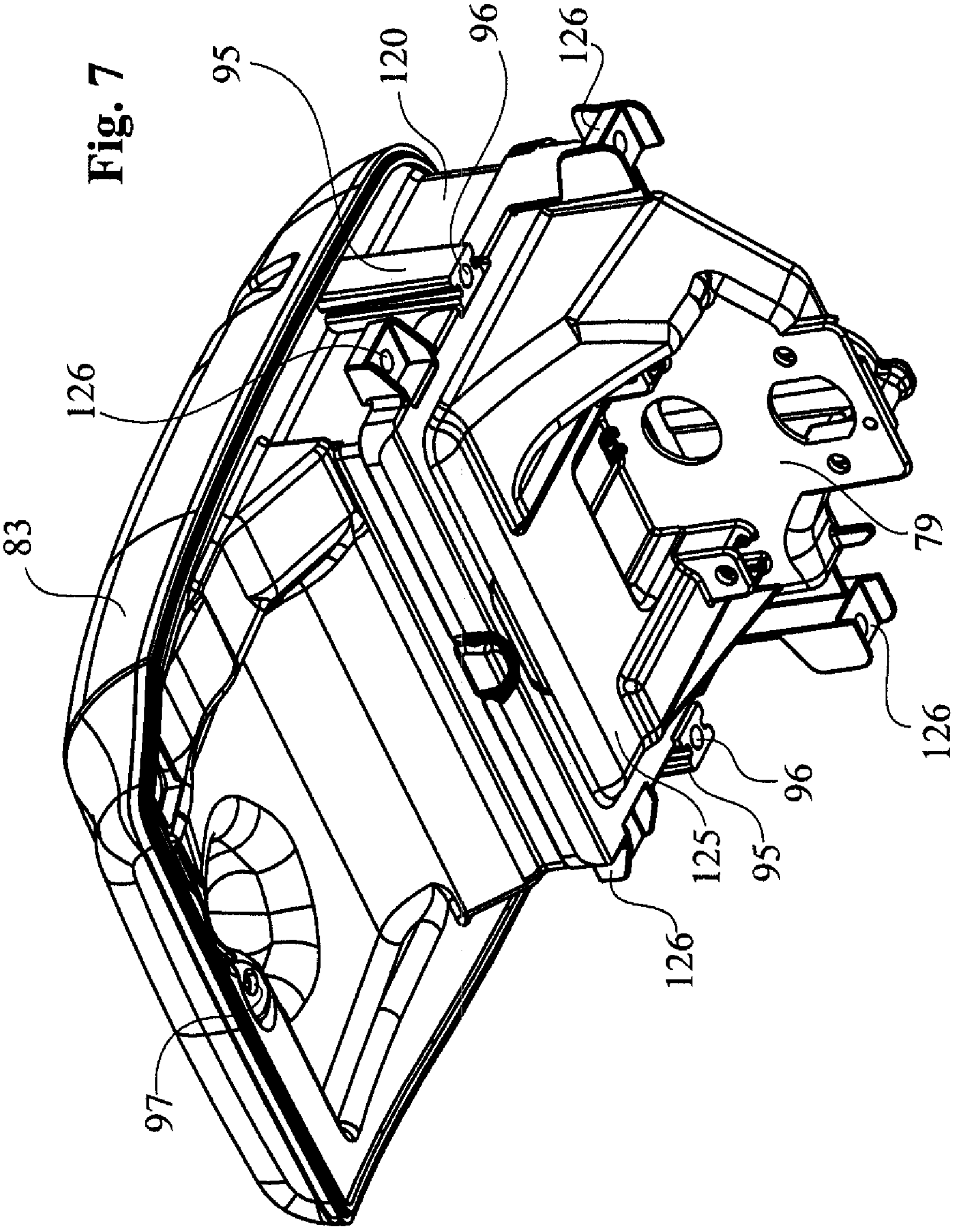
FIG. 7 shows the components of the filter assembly of FIG. 6 assembled.

The machine unit 2 includes a filter assembly 10, FIG. 2, FIG. 7, a two-stroke internal combustion engine 11 with an engine cylinder 13 with a cylinder bore 12, a crankcase 15, an assembly 16 for supplying cleaned air and fuel to the engine, a fuel tank 17, a muffler 18, handles 19, 20, controls 21, 22, and supports 23, 24 on the underside of the machine unit 2 for allowing upright positioning of the machine on a flat ground. An endless driving belt (not shown) transmits the power from the machine unit 2 to the cutter disc 3 in a manner known per se.

The cylinder 13 and the crankcase 15 are tilted forwards. The tilt angle α between the centre line 30 of the engine cylinder and a perpendicular 32 to a base line 33 or base plane amounts to 15 degrees according to the embodiment. The base plane 33 is the horizontal plane on which the front and rear supports 23 and 24 of the machine unit are resting as shown in FIG. 1. It should be understood that the reference to the base line/plane 33 in order to describe the degree of tilt of the cylinder 13 and the crankcase 15 presupposes that the height of the supports 23 and 24 are moderate The top of the cylinder 13 is covered by a cap 40 for directing cooling air to the cooling fins of the cylinder. A front part of the cap 40 and a section of the cylinder 13 beneath the cap 40 face the tool unit 1 at a moderate distance from the disc guard 5. The spark plug 6 of the engine extends through a hole in the top of the cap and is pointing obliquely up in the very front top corner 8 of the machine unit 2, where the top and the front side of the machine unit meet, covered by a cupola-like elevation 7 in the front part of a filter bottom 9, included in the filter assembly 10.

Above the fuel tank 17 there is a space 70, which is a good size, especially in the longitudinal direction, due to the inclination of the engine 11. The assembly 16 for the supply of air and fuel to the engine 11 is accommodated in the space, between the fuel tank 17 and the filter assembly 10. The assembly 16 includes a carburettor 71 and an intake pipe extending between the carburettor and an induction port of the cylinder. The engine 11, according to the preferred embodiment, is a crankcase scavenged two-stroke internal combustion engine having an additional air supply to its transfer ducts (not shown), which have ports in the engine's cylinder wall. Therefore the assembly 16 also includes an inlet 76 for additional air which has been cleaned in the air cleaning system, and two parallel connecting ducts leading to connecting ports in the cylinder wall. The tilted cylinder is an advantage considering the extra space available for filters and intake system.

The carburettor 71, the air inlet 76, the intake pipe and the connecting ducts are assembled and mounted on a bracket 79. The bracket 79 in turn is mounted in a rear part of the space 70, near a rear wall 80 of the machine unit, and is integrated with the filter assembly 10, which in turn forms part of the integrated air cleaning system for cleaning the air that shall be supplied to the engine. This system includes, according to the preferred and disclosed embodiment, in order of the air flow, a first dynamic cleaning step, a second dynamic cleaning step, a first filtering step in a filter referred to as pre-filter 84, and a second filtering step in a filter referred to as main filter 85.

In the following description of the air cleaning system, the filter assembly 10 and its various components first shall be explained.

Figure 4:
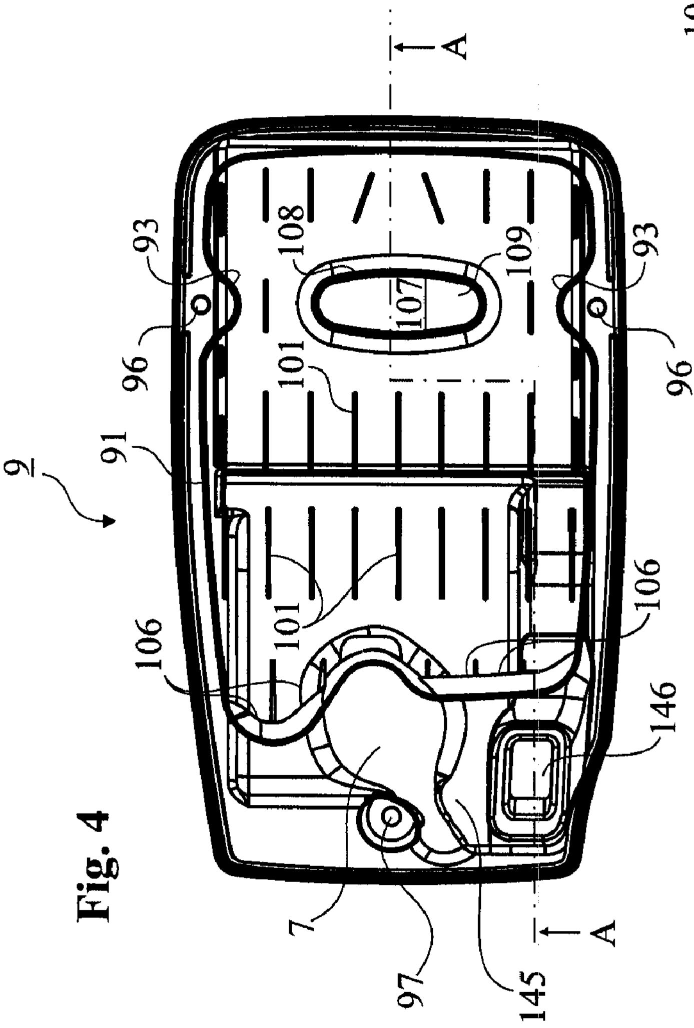
FIG. 4 shows the filter from above.
Figure 5:
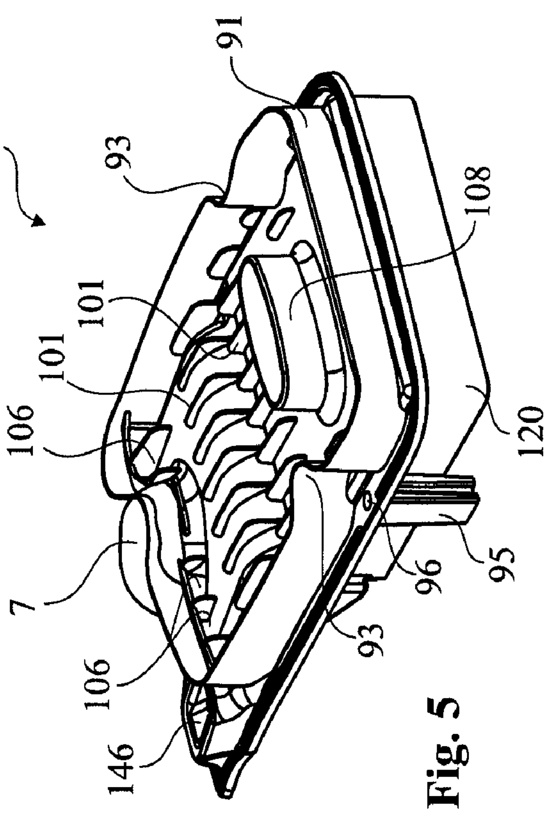
FIG. 5 is a perspective view of the filter bottom as viewed obliquely from the right and from the rear.

The circumferential contour of the top cover 83 matches the circumferential contour of the pre-filter bottom 9. A first frame 91 extends from the pre-filter bottom 9 upwards, i.e. in a direction towards the top cover 83. The first frame 91, which is cylindrical, runs adjacent to the rear edge of the pre-filter bottom 9 and also adjacent to the rear wall 92 of the top cover and along the side walls of the top cover and traverses the pre-filter bottom 9 in the region of the cupola 7. The side sections of the frame 91 make two inward bends 93 at a short distance from the rear section of the frame. In the region of each of the inward bends 93, a vertical spacing sleeve 95 is provided on the pre-filter bottom 9 for a clamping screw. The contour of the first frame 91 is shown in FIG. 4 and in FIG. 5. Clearance borings 96 for the screws run through the spacing sleeves 95, and a third clearance hole 97 for a front clamping screw 114, FIG. 2, is provided in the front section of the pre-filter bottom 9.

A second cylindrical frame 98 extends downwards from the top cover 83 inside of and at a short distance from the first frame 91. It slightly overlaps the first frame 91 as is seen from FIG. 2 and FIG. 3. The first frame 91 and the second frame 98 in combination form a circumferential side wall of an upper filter chamber 99 provided between the top cover 83 and the pre-filter bottom 9.

Figure 6:
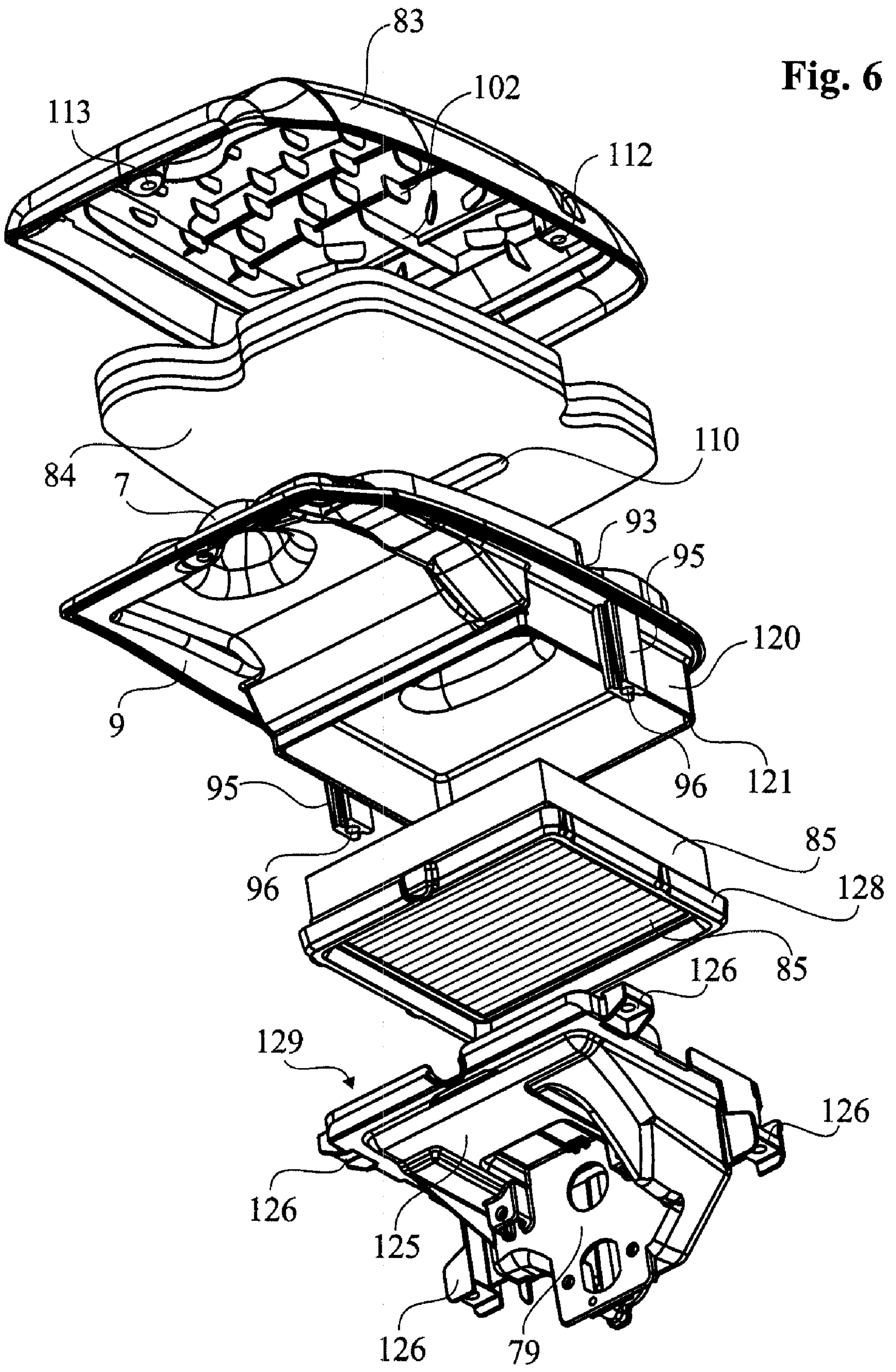
FIG. 6 is an exploded view, showing the components included in a filter assembly.

A pre-filter 84 is provided in the said upper filter chamber 99. It has in principle the same contour as the first and second frames 91, 98 and is slightly pressed against the first frame 91. It rests on a number of vertical, longitudinal spacer fins 101, which project upwards from the pre-filter bottom 9. Vertical, longitudinally extending spacing fins 102 are also provided on top of the pre-filter 84, FIG. 6, forming protrusions on the inner surface of the top cover 83. The fins 101 on the pre-filter bottom provides a free lower space 103 for incoming air to be cleaned in the pre-filter 84, while the fins 102 on top of the pre-filter 84 establishes a free upper space 104, where the filtrated air is collected for further cleaning in the main filter 85. A plurality of entrance openings 106 to the lower space 103 for air to be cleaned are provided in the front section of the first frame 91. More entrance openings may also be provided along the sides and in the rear section of the first frame 91. Further, an exit opening 107 is provided in the pre-filter bottom, and an upraised wall 108, surrounding the hole 107, forms a conduit 109 from the upper space 104 to the main filter 85 for air which has been cleaned in the pre-filter. The pre-filter 84 has a hole 110, which matches the wall 108.

Two clearance holes 112 are provided in the side walls of the top cover 83, matching the clearance borings 96 in the spacing sleeves 95 provided on the pre-filter bottom 9, and a third hole 113 is located in the front of the top cover 83 matching the front hole 97 in the pre-filter bottom.

In the assembled filter assembly 10, the second, upper frame 98 is pressed a distance down into the pre-filter 84, which is made of foamed plastics soaked with oil, such that the pre-filter is slightly compressed in the region adjacent to the surrounding first frame 91. This provides an efficient sealing against the environment, preventing polluted air existing outside of the first and second frames 91, 98 from entering the upper space 104 between the pre-filter 84 and the top cover 83.

A main filter wall 120 is formed as a frame, extending downwards at right angle from the underside of the pre-filter bottom 9, in the rear part of the pre-filter bottom. It is cylindrical and is square in cross section. The wall 120 is completely closed, that is, it has no openings. Its lower edge 121 defines a plane, which is parallel with the underside of the pre-filter bottom, from which the main filter wall 120 is projecting.

Figure 3:
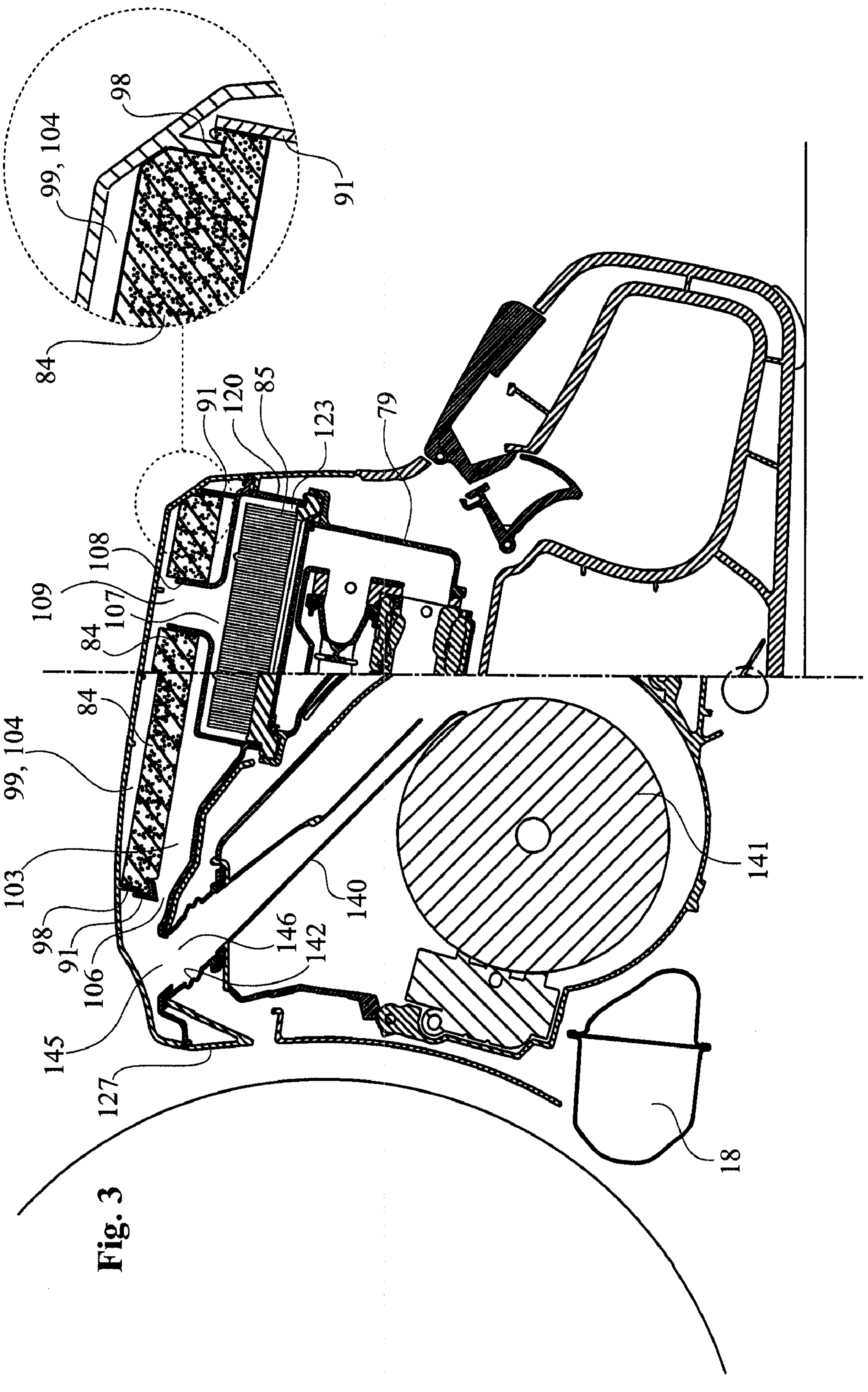

The main filter wall 120 embraces a lower filter chamber 123, also referred to as main filter chamber, accommodated in the space 70. The main filter chamber 123 is defined by said main filter wall 120, the pre-filter bottom 9, which forms a sealing of chamber 123, and a main filter bottom 125. The main filter bottom 125 is designed as a shelf, which extends forwards from the bracket 79, mentioned in the foregoing, which carries the assembly 16 for supplying cleaned air and fuel to the engine 11. The bracket 79 is fastened to the machine body via four lugs 126 by means of screws (not shown). Only a very small part of the machine body 127 in the top front part of the machine body, is shown in FIG. 2 and FIG. 3.

The main filter 85 is a paper filter of a type known per se. The filter paper is fan-folded and secured through molding to a comparatively thick and broad gasket ring 128 made of soft rubber or a soft thermoplastic material. The gasket ring 128 runs around the main filter, in the bottom part thereof. In the assembled filter assembly 10, FIG. 2, FIG. 3 and FIG. 7, the gasket ring 128 is accommodated in a gasket groove 129, which surrounds a lower space 130 of the main filter chamber 123 beneath the main filter 85. The said lower space 130 communicates with a vertical entrance conduit 131 in the bracket 79 to the carburettor 71 and air inlet 76.

In the main filter chamber 123, between the main filter 85 and the lower space 130, a protective filter 133 may optionally be provided. The optional protective filter 133 serves to prevent objects from falling down into the entrance conduit 131 and/or into the carburettor 71 or the air inlet 76 by accident in connection with change of main filter 85. The protective filter 133 may for example consist of a metal net.

When the filter assembly 10 shall be assembled, the pre-filter 84 is first placed on the pre-filter bottom 9 inside the first frame 91; the top cover 83 is placed on top of the pre-filter bottom 9; and the main filter 85 is inserted from the underside into the space defined by the main filter wall 120. The operator keeps the said components together by hand and puts down the whole package over the engine 11 and over the bracket 79. A plurality of grooves and matching male members are provided to secure a proper fit, including the gasket groove 129 on top of the bracket 79 which is already secured to the machine body 127, and the gasket ring 128 which enters the gasket groove 129. The whole filter assembly 10 is fastened to the machine body 127 by means of just three clamping screws. One front clamping screw 114 is shown in FIG. 2, which clamping screw extends through the front clearance hole 113 in the top cover 83 and through a front clearance hole 97 in the pre-filter body 9. Two other clamping screws, which are not shown in the drawings, extend through the clearance holes 112 and clearance borings 96 in the region of the sides of the top cover 83 and the filter bottom 9, respectively, fastening the filter assembly 10 to the machine body 127.

At the same time as the components of the filter assembly 10 are pressed together and clamped to the machine body 127, the sealings are established. These sealings consist of a first sealing between the pre-filter 84 and the frames 91 and 98, and the sealing attained by the gasket ring 128 in the gasket groove 129 in combination with the main filter wall 120, respectively. These sealings are shown more in detail at a larger scale in the circles in FIG. 3 and FIG. 2, respectively.

As is illustrated in the circle in FIG. 3, the upper, second frame 98 is pressed down into the pre-filter 84 in the region adjacent to the surrounding first frame 91, such that the pre-filter is compressed in that region, increasing also the pressure between the filter and the two frames 91 and 98, which provides an efficient sealing function. Due to the overlap between the two frames 91 and 98, also a labyrinth sealing effect may optionally be attained.

Now as far as the sealing of the main filter chamber 123 is concerned, reference is made to the enlarged detail in FIG. 2, which shows how the lower edge of the wall 120 is pressed down into the soft rubber of gasket 128, at the same time as the gasket 128 seals against the bottom and walls of the gasket groove 129.

As mentioned in the foregoing, the air cleaning system also includes two dynamic cleaning steps. In the first dynamic cleaning step, the air from the outer environment, which may be polluted by powdered concrete, stone powder and the like, produced by the working machine, is subjected to centrifugal cleaning in a manner known per se. For this purpose a nozzle tube 140 is placed close to the fly wheel/impeller 141 (schematically shown in FIG. 3) of the machine. The fan blades of the fly wheel/impeller 141 force an airflow in a manner known out towards the periphery of a fan housing (not shown) such that a major part of the dust and other solid products of the centrifuged air can be separated from the more cleaner fraction, which is sucked through the nozzle tube 140 upwards and forwards. Via a hose 142, which may be made of rubber, the centrifugally cleaned air is guided to a swirling chamber 145 located in the very top front portion 8 of the machine unit 2 in front of the pre-filter chamber 86, between the top cover 83 and the pre-filter bottom 9. For this purpose there is an entrance hole 146 for the centrifugally cleaned air in the floor of the swirling chamber 145, that is, in the front section of the pre-filter bottom 9. The entrance opening 146 is provided adjacent to the left hand side of the top cover 83, which also forms the roof of the swirling chamber 145. The swirling chamber 145 also accommodates the cupola 7. The passageway of the air through the nozzle 140 and the connecting rubber hose 142 is directed obliquely upwards, towards the front wall of the top cover 83. All these circumstances, the direction of the incoming air flow, the location of the entrance opening 146 and the irregularity of the shape of the chamber 145 promotes strong turbulence in the chamber 145. This causes a substantial fraction of solid pollutions to be deposited on the walls, floor and ceiling of the swirling chamber 145, in other words on various surfaces of the chamber, before the air passes through the openings 106 in the lower part of the first frame 91 and enters the lower space 103 in the upper filter chamber 86, where the pre-filter 84 is accommodated.

From the lower space 103, the air goes through the pre-filter 84, where the majority of remaining pollutants are collected in the oil soaked filter. From the upper space 104 of the upper filter chamber 86, the air proceeds via the conduit 107 to an upper space 134 in the lower/main filter chamber 123. In the main filter chamber 123, the majority of any remaining pollutants are collected in the main filter 85, before the air via the protective filter 133 enters the entrance conduit 131, from where it will proceed to be used for the combustion in the combustion engine.

The invention claimed is:

1. A portable, hand-held, combustion engine powered working machine comprising a tool unit (1) including a rotatable working tool (3), and a machine unit (2) including an internal combustion engine (11), an assembly (16) for supplying air and fuel to the engine, and an air cleaning system, which comprises a filter assembly (10) including at least two filters (84,85), referred to as pre-filter (84) and main filter (85), for cleaning the air that shall be supplied to the engine, wherein the pre-filter is accommodated in an upper filter chamber (86) between a top cover (83) and a pre-filter bottom (9), and the main filter is accommodated in a lower filter chamber under the pre-filter bottom, said lower filter chamber being defined by the underside of the pre-filter bottom, a second filter bottom (125) at a distance from the pre-filter bottom, and a closed, circumferential wall (120) between the pre-filter bottom and the second filter bottom, said closed, circumferential wall forming a downwards directed protrusion on the underside of the upper filter bottom, the second filter bottom (125) forms a shelf on a bracket (79), carrying said assembly (16) for supplying air and fuel to the engine.

2. A machine according to claim 1, wherein the main filter (85) is accommodated in said lower filter chamber (123) between an upper space (134) in said lower filter chamber and a lower space (130) between said main filter (85) and said shelf (125) on said bracket (79).

3. A machine according to claim 2, wherein the main filter (85) is a fan-folded paper filter maintained by a gasket ring (128) of a soft material encircling the lower circumferential edge of the fan-folded filter, said gasket ring being accommodated in a gasket groove (129) encircling the upper part of said bracket (79) and said shelf forming said main filter bottom (125), a lower edge (121) of said main filter wall (120) being pressed down into said gasket ring (128) in the assembled filter assembly (10), establishing a sealing between the combined main filter chamber (123) and an entrance conduit (131) connecting the said lower space (130) of the main filter chamber to the assembly (16) for supplying cleaned air and fuel to the engine.

4. A machine according to claim 1, wherein the upper/pre-filter chamber (86) is restricted in the lateral directions by two cylindrical frames; a first frame (91) projecting upwards from the pre-filter bottom and a second frame (98) projecting downwards from the top cover (83), one of said first and second frames being provided at a short distance from the other such that the two frames overlap each other, the inner one of the two frames compressing the pre-filter in the region adjacent to the frames, promoting a sealing between the upper filter chamber (86) and the space outside said first and second frames.

5. A machine according to claim 4, wherein the first frame (91) protruding from the pre-filter bottom is the outer one of the two frames.

6. A machine according to claim 1, wherein the air cleaning system includes a first dynamic cleaning step in the form of centrifugal cleaning and a second dynamic cleaning step in a swirling chamber (145).

7. A machine according to claim 6, wherein the swirling chamber is provided in the top front part of the machine unit, between the top cover (83) and the pre-filter bottom (9), in front of the upper/pre-filter chamber (86), an entrance opening (146) for centrifugal cleaned air being provided in the floor of said swirling chamber (145), said floor being defined by said pre-filter bottom (9).

8. A machine according to claim 7, wherein the passageway of the centrifugal cleaned air entering the swirling chamber (145) is directed obliquely upwards against the front top or wall of said swirling chamber.

9. A machine according to claim 8, wherein the entrance opening (146) in the swirling chamber floor is located close to one side of said chamber, said chamber having an irregularly internal shape.

10. A machine according to any one of claims 7-9, wherein at least one entrance opening (106) is provided in said first frame (91) surrounding the pre-filter (84), connecting the swirling chamber (145) to the lower space (103) of the upper chamber (86) between the pre-filter bottom (9) and the pre-filter (84).

* * * * *